May 23, 1939.   C. PFANSTIEHL   2,159,707
TIP WELDING METHOD
Filed Aug. 12, 1938
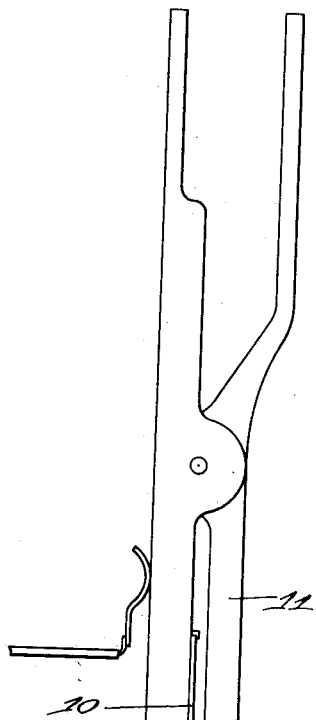
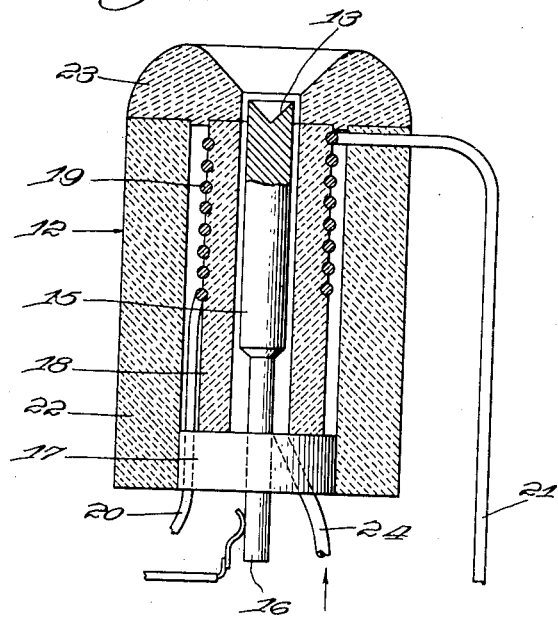
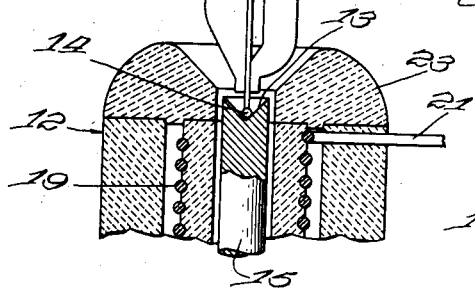
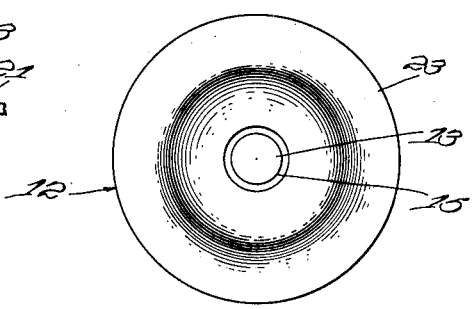
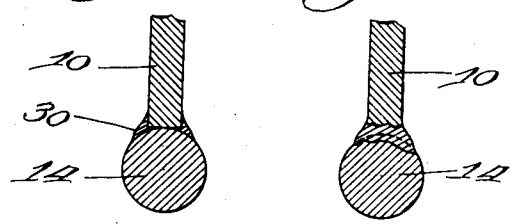
Inventor:
Carl Pfanstiehl.
By Chritton, Wiles, Davis, Hirschl & Dawson
Attys.

Patented May 23, 1939

2,159,707

UNITED STATES PATENT OFFICE 2,159,707

TIP WELDING METHOD

Carl Pfanstiehl, Highland Park, Ill., assignor to Pfanstiehl Chemical Company, a corporation of Illinois Application August 12, 1938, Serial No. 224,571

1 Claim. (Cl. 219—10)

This invention relates to tip welding method, and more particularly to a method for welding metal tips to bases of metal differing therefrom in coefficient of thermal expansion.

One feature of this invention is that it provides an improved joint between small tip pellets and the bases to which they are welded.

Another feature of this invention is that it provides a joint between tips and bases of metal differing in melting point and coefficient of thermal expansion of such a type that subsequent changes in temperature will not cause the tip to crack off or separate from the base.

Other features and advantages of this invention will be apparent from the following specification and the drawing, in which:

Figure 1 is a side elevation of an embodiment of this invention; Fig. 2 is a detailed sectional view of the pellet holder; Fig. 3 is a top plan view of that holder; Fig. 4 is a detailed view of a pellet in contact with a base; and Fig. 5 is a detailed sectional view of the pellet and base after they have been welded.

It is frequently desirable to weld or join small tip elements to bases of a different metal. This is especially true where it is desirable, as in pen points or meter shaft bearings, to have a tip of very hard smooth metal. In the manufacture of pen points, for example, it has been customary to use tips of iridium, osmium, ruthenium or alloys of these and similar metals. The base metal of which the pen is made, generally gold or steel, has a lower melting point than these tip alloys, and when the tip is welded to the base in accordance with conventional practice the end of the base fuses and flows over part of the tip pellet, wetting the surface and adhering thereto when it freezes. Since the pellet metal does not melt, the strength of the joint depends upon this wetting action, and where the metals differ in coefficient of thermal expansion subsequent temperature changes to which the fabricated pen is exposed frequently caused the tip to crack loose from the base. This is, of course, an undesirable condition.

In those instances where the base has a relatively low melting point compared to the tip, it is also preferred to employ a flux. This flux must have a quite high melting point in order not to be too thin at the temperatures for welding. On the other hand, it is highly desirable that the flux be melted prior to the initiation of the welding current, otherwise it will vastly increase the resistance and cause a surge of current when it is melted, which may interfere seriously with the welding operation.

The present invention obviates these and other difficulties by providing a method for welding small metal tips to bases of metal differing therefrom in coefficient of thermal expansion whereby a portion of the metal of each of the elements adjacent each other is caused to melt, so that the metal mingles before freezing. Thus a joint is provided of what may be termed a graduating alloy of the base and pellet metal. That is, the metal at the joint is practically the equivalent of the pellet metal adjacent the portion of the pellet which did not melt, and graduates through a mixture of the pellet and base metal to a metal which is practically that of the base adjacent that portion of the base which did not melt. Thus there is no one point or plane at which the metal differs greatly in coefficient of thermal expansion, with a tendency to cleave or crack.

In the particular embodiment of this invention illustrated herewith the metal base element 10, here illustrated as a pen, is gripped in a holder 11. A second holder 12 has a pocket 13 adapted to receive and hold a small metal pellet tip element 14 which it is desired to weld to the pen 10. One of the holders is movably mounted and, by any appropriate means, urged toward the other to bring the two elements together in lightly pressed contact. An operative welding circuit is provided for passing a welding current through the holders and elements, and for initiating and terminating the flow of current at desired intervals. Such apparatus in general is fully shown in my patents, Nos. 2,005,752, issued June 25, 1935, and 2,032,887, issued March 3, 1936, and a description of the remainder of the apparatus will not be repeated at this time.

The holder 12 comprises a central member or rod 15 of tungsten or other conductive material of very high melting point. The rod, as here shown, has a diameter of about one-eighth of an inch throughout its major portion, and a reduced lower portion 16 adapted to furnish one terminal for the welding current, the circuit being completed through the tip and base elements and the holder 11. The reduced portion 16 of the tungsten rod is mounted in a base 17 of molded ceramic material.

The rod is surrounded with a tube 18 of ceramic heat resisting material, preferably somewhat porous. This tube is here disclosed as being of alundum, a bonded aluminum oxide material. The tube 18 is provided on the outside thereof, about the upper portion of the rod 15, with grooves in which a heater element 19 is wound. This heater element comprises a plurality of turns of resistance wire with a high melting point, suitable for heating by electrical means, and may be of tungsten or molybdenum where it is surrounded by an atmosphere of hydrogen, for example. The heater element 19 terminates in leads 20 and 21 brought outside of the holder 12 and adapted to be supplied with current from a relatively low voltage, high amperage source. The element may be heated, for example, by a current of six to ten amperes at six volts.

An outer or second tube 22 of refractory material surrounds the base 17 and heater element 19, and serves as a heat insulating means to keep the heat developed by the element 19 within the holder. The top of the tubes may be sealed together, as here shown, by a refractory cement 23. This is preferably built up about the pocket 13 in the tungsten rod, so that hydrogen, supplied through the tube 24, will pass up about the tungsten rod and provide a reducing atmosphere about the pellet and base at the point of weld. The fact that the tube 18 is of porous material enables the wire comprising the heating element 19 to be also surrounded with hydrogen, so that a metal can be used which would otherwise break down were it exposed to oxygen.

In operation the heater element 19 would be continuously energized to maintain the tungsten rod 15 at a visible temperature, somewhere in the range from red heat up through white heat. This temperature would be so chosen as to be near but sufficiently below the point at which the metal element with the lowest melting point would fuse that there is no danger of melting of either of the elements before initiating of the welding current. The minute pellet, as for example a pellet having a high osmium content of fifty per cent or more, would be fed to the pocket 13 by any appropriate means, the base 10 be placed in the holder 11, and the two brought together to urge the elements into lightly pressed contact with each other. The substantial temperature of the tungsten rod 15 would, because of its large heat storage capacity, of course, almost instantaneously heat the pellet 14 to an equivalent temperature. The two elements, at least adjacent the junction thereof, would thus be heated to a temperature near but somewhat below the melting point of that one which would fuse at the lowest temperature. A welding current, supplied and initiated in accordance with known methods, would then be passed through the elements. The resistance at the junction or point of contact would cause a considerable amount of heat to be developed at this point, so that the junction of these two elements and portions thereof immediately adjacent the junction would be raised to a much higher temperature, above that at which the element with the highest melting point would fuse.

In carrying out the process, the tungsten rod 15 is heated to a temperature below the melting point of the pellet to be employed and also low enough not to melt the base metal when it contacts the pellet.

A pellet 14, for example, of osmium, iridium alloy is then dropped into the pocket, and is practically instantaneously heated to approximately the temperature of the rod. A base 10 such as a pen nib is dipped into a flux 30 which, on contact with the heated pellet 14, melts as shown in Figure 4, and serves to provide a uniform electrical contact between tip and pellet, and the welding current is promptly initiated and passed through the two elements. The current is strong enough to melt a portion of the tip and also a portion of the base, and the two portions of melted material mingle and form the graded alloy heretofore described.

If it were not for the higher temperature of the pellet at the instant of contact and initiation of current, it would be very difficult to melt metal of the pellet without melting too much of the base. It is, therefore, desirable that the welding current be initiated promptly at the moment of contact.

However, the radiation from the base is so much greater than from the pellet that delay in initiating the current is not necessarily fatal to the effect desired.

The invention has the further desirable effect that it enables tip metal to be heated to a high enough temperature to wet the base metal even in those instances where the tip metal is not melted or is only slightly melted. With some pen point alloy the metal wets gold or steel only at higher temperature ranges and, even where it was possible to melt the tip without preheating, wetting did not always occur to a satisfactory degree.

Even though a pellet having a high osmium content, for example, were used in this device, the preheating to a substantial temperature would enable the welding current to effect a fusion or melting not only part of the lower melting point base metal but also of a portion of the pellet metal adjacent the junction. Where the pellet is not previously heated to such a substantial temperature the passage of the welding current through the elements may merely cause the base metal to melt and flow onto the pellet without melting any portion of the pellet metal. The duration of flow of the welding current must, of course, be brief, since were the current to remain on long enough to melt a pellet which had not been preheated, the base metal would be so greatly fused that it would flow down all around the pellet and require subsequent grinding or other operations to remove it. Where the holder rod is raised to a substantial temperature before the passage of the welding current not only is the pellet raised to a similar temperature, but loss of the heat subsequently generated at the junction by the welding current through transfer to the holder rod is reduced, since the temperature differential between the junction at the time of welding and the holder rod is nowhere near as great as when the rod is at room temperature or only slightly higher.

In some instances, for example, where an element containing a large proportion of tungsten is employed, the tip may not be melted at all, or only very slightly, but in such cases the preheating assists in procuring a better wetting.

Reference to Fig. 5 shows the type of weld or joint achieved by this method and apparatus. Not only is base metal melted, but also a portion of the pellet metal adjacent the junction, so that the two metals mingle before freezing when the welding current is stopped. The mingling of the metals provides a joint which graduates from the metal of the pellet to that of the base, so that expansions of the pellet and base when exposed to temperature changes do not result in stresses localized at one point.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as permissible, in view of the prior art.

This application is a continuation in part of my copending application Serial No. 173,473, filed November 8, 1937. Apparatus suitable for carrying out the present process is shown in Patent 2,145,275 issued January 31, 1939.

The foregoing detailed description has been given for clearness of understanding only, and no unnecessary limitations should be understood therefrom.

I claim:

In the process of welding of minute tips of high melting point metal to a gold base element, in which tips are positioned on a conductive support of high melting point, and at least one of the tip and base is provided with a coating of high melting point flux; the steps of bringing tip and base into lightly pressed contact while the tip is on the conductive support, preheating the support to a temperature sufficient to maintain the flux in fluid condition, but below the melting point of the tip, base and support, and then briefly passing an electric welding current from the base through the tip to the support to raise the temperature at the junction of the tip and base to melt at least a portion of one element, and freezing the melted metal to join said elements.

CARL PFANSTIEHL.